(12) United States Patent
Bonn et al.

(10) Patent No.: US 10,715,969 B1
(45) Date of Patent: Jul. 14, 2020

(54) WIRELESS MESSAGING USING AN ENHANCED QUALITY-OF-SERVICE (QOS)

(71) Applicant: Sprint Communications Company L.P., Overland Park, KS (US)

(72) Inventors: Mark J. Bonn, Granite Bay, CA (US); Sean Patrick Hoelzle, Collegeville, PA (US); Muhammad Nauhman Bashir Gora, Irvine, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/751,558

(22) Filed: Jan. 24, 2020

(51) Int. Cl.
*H04W 4/12* (2009.01)
*H04W 28/02* (2009.01)

(52) U.S. Cl.
CPC ......... *H04W 4/12* (2013.01); *H04W 28/0268* (2013.01)

(58) Field of Classification Search
CPC ..... H04W 4/00; H04W 4/12; H04W 28/0268; H04L 65/60
See application file for complete search history.

(56) References Cited

U.S. PATENT DOCUMENTS

| | | | |
|---|---|---|---|
| 6,577,644 B1 * | 6/2003 | Chuah | H04L 47/10 370/235 |
| 8,510,804 B1 | 8/2013 | Bonn et al. | |
| 9,509,723 B1 | 11/2016 | Khan et al. | |
| 9,848,058 B2 | 12/2017 | Johnson et al. | |
| 9,942,766 B1 | 4/2018 | Bonn et al. | |
| 10,361,953 B1 | 7/2019 | Bonn et al. | |
| 10,484,381 B1 | 11/2019 | Bonn et al. | |
| 2001/0005381 A1 * | 6/2001 | Sugiyama | H04Q 11/0478 370/466 |
| 2001/0007560 A1 * | 7/2001 | Masuda | H04Q 11/0478 370/401 |
| 2006/0068761 A1 | 3/2006 | Chambers et al. | |
| 2015/0016299 A1 * | 1/2015 | Zhang | H04L 43/028 370/253 |

* cited by examiner

*Primary Examiner* — Dinh Nguyen

(57) ABSTRACT

In a wireless communication network, provisioning circuitry transfers a QoS code to a Subscriber Identity Module (SIM) in wireless User Equipment (UE). The UE receives a user message, and in response, retrieves the QoS code from the SIM. The UE wirelessly transfers a network message having the user message and the QoS code to messaging circuitry. In response to the QoS code, the messaging circuitry adds a QoS header to the network message. The messaging circuitry handles the network message with the enhanced QoS responsive to the QoS header. The messaging circuitry generates a new network message having the QoS header and the user message. The messaging circuitry handles the new network message with the enhanced QoS. The messaging circuitry transfers the new network message having the QoS header and the user message for delivery to the destination.

20 Claims, 7 Drawing Sheets

WIRELESS MESSAGING USING AN ENHANCED QUALITY-OF-SERVICE (QOS)

TECHNICAL BACKGROUND

Wireless communication networks provide wireless data services to wireless user devices. Exemplary wireless data services include machine-control, Internet-access, media-streaming, and social-networking. Exemplary wireless user devices comprise phones, computers, vehicles, robots, and sensors. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), and Low-Power Wide Area Network (LP-WAN).

The wireless user devices are often used to transmit and receive short data messages. To serve the data messaging, the wireless communication networks deploy Internet Protocol Multimedia Subsystems (IMS) to handle the short data massaging. A popular form of data messaging served by IMS comprises Internet Protocol Short Messaging (IPSM). The wireless user devices exchange short IP messages over the wireless access nodes and the IMS. The wireless user devices and the IMS often use Session Initiation Protocol (SIP) as an IP wrapper for the data message. The network address for IMS is stored in the Subscriber Identity Module (SIM) in the wireless user devices during device activation.

Wireless Priority Service (WPS) is a government mandated wireless communication service for critical personnel like first responders. WPS maintains wireless communication quality for the critical personnel during network overloads. WPS devices use a special WPS access class to avoid access delays during the network overloads. WPS devices use a special Quality-of-Service (QoS) to avoid message discard during the network overloads. Unfortunately, WPS IPSM remains open to attack by malicious devices that may illegitimately obtain WPS QoS and diminish the WPS QoS of legitimate WPS devices.

TECHNICAL OVERVIEW

In a wireless communication network, provisioning circuitry transfers a QoS code to a Subscriber Identity Module (SIM) in a wireless User Equipment (UE). The UE receives a user message, and in response, retrieves the QoS code from the SIM. The UE wirelessly transfers a network message having the user message and the QoS code to messaging circuitry. The QoS code may be a WPS domain name in the destination field of a Session Initiation Protocol (SIP) message. In response to the QoS code, the messaging circuitry adds a QoS header to the network message. The messaging circuitry handles the network message with the enhanced QoS responsive to the QoS header. The messaging circuitry generates a new network message having the QoS header and the user message. The messaging circuitry handles the new network message with the enhanced QoS. The messaging circuitry transfers the new network message having the QoS header and the user message for delivery to the destination.

DETAILED DESCRIPTION

Figure 1:
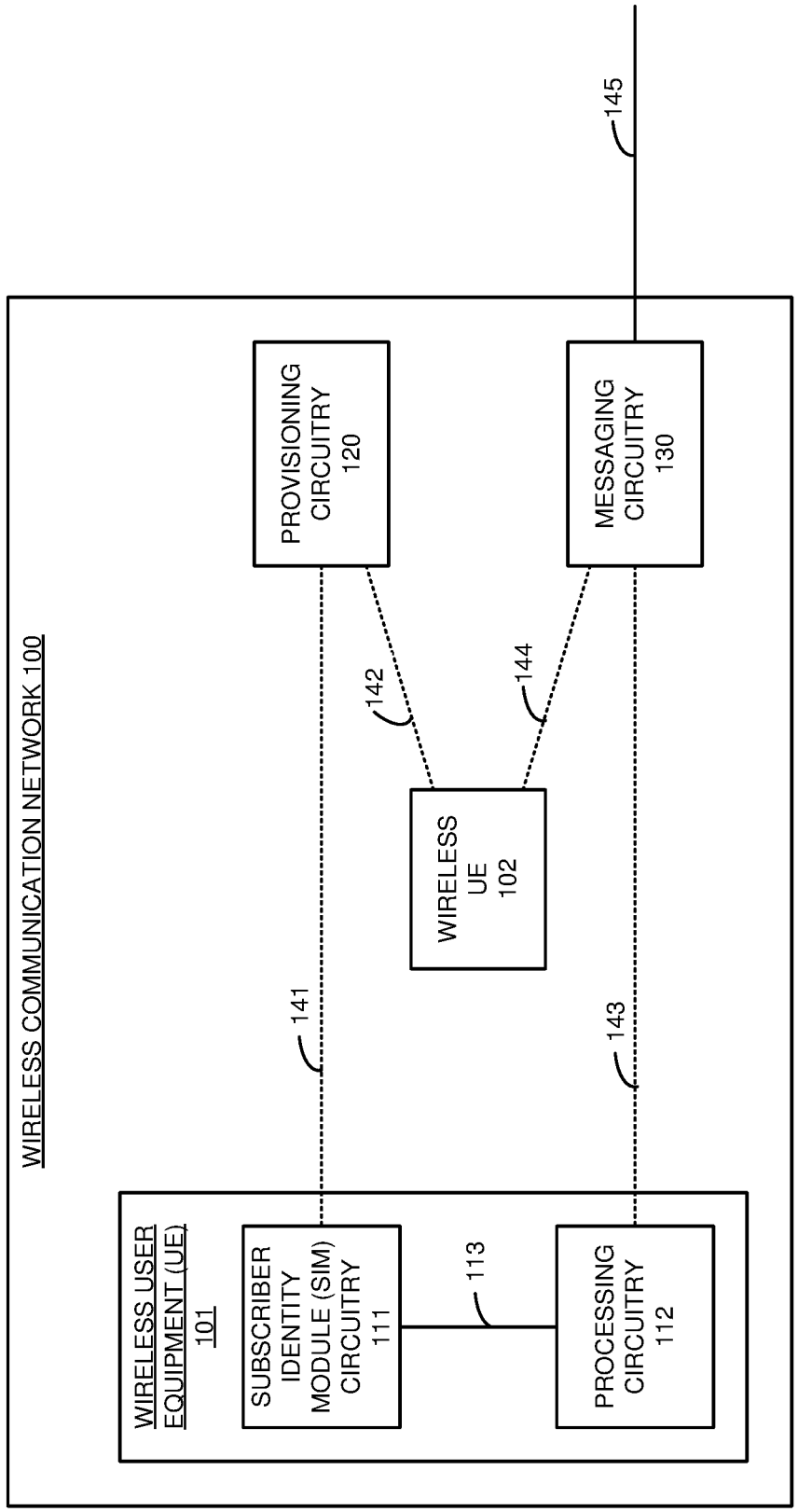
FIG. 1 illustrates a wireless communication network that transfers user messages for wireless User Equipment (UEs) using enhanced Quality-of-Service (QoS).

FIG. 1 illustrates wireless communication network 100 that transfers user messages for wireless User Equipment (UEs) 101-102 using enhanced Quality-of-Service (QoS). Wireless communication network 100 comprises wireless UEs 101-102, provisioning circuitry 120, and messaging circuitry 130. UEs 101-102 might be phones, computers, robots, vehicles, or some other data appliances with wireless communication circuitry. In some examples, the enhanced QoS comprises an overload exemption in the messaging circuitry 130 where messages with the enhanced QoS are not discarded during processor or memory overloads. The enhanced QoS may comprise Wireless Priority Service (WPS).

UE 101 comprises Subscriber Identity Module (SIM) circuitry 111 and processing circuitry 112 which are coupled over data link 113. SIM circuitry 111 and provisioning circuitry 120 communicate over data link 141. The SIM in wireless UE 102 and provisioning circuitry 120 communicate over data link 142. Processing circuitry 112 and messaging circuitry 130 communicate over data link 143. The processing circuitry in UE 102 and messaging circuitry 130 communicate over data link 144. Messaging circuitry 130 and other data systems communicate over data link 145.

Data links 141-145 use Institute of Electrical and Electronic Engineers (IEEE) 802.3 (Ethernet), Time Division Multiplex (TDM), Data Over Cable System Interface Specification (DOCSIS), Internet Protocol (IP), Fifth Generation New Radio (5GNR), Long Term Evolution (LTE), IEEE 802.11 (WIFI), Low-Power Wide Area Network (LP-WAN), and/or some other communication protocol. Data links 141-142 include at least some wireless links, and links 142-145 may be wireless and/or wireline. Data links 141-145 typically comprise various intermediate network elements like access nodes, gateways, and routers.

In UE 101, SIM circuitry 111 comprises a microprocessor. Processing circuitry 112 comprises a radio and baseband circuitry. Data link 113 comprises a virtual switch, interprocessor communication, bus interface, Ethernet link, IP connection, and/or some other data communication interface. The radio comprises antennas, filters, amplifiers, analog-to-digital interfaces, microprocessors, memory, software, transceivers, bus circuitry, and the like. The baseband circuitry comprises microprocessors, memory, software, transceivers, and bus circuitry, and the like. The microprocessors comprise Digital Signal Processors (DSP), Central Processing Units (CPUs), Graphical Processing Units (GPUs), Application-Specific Integrated Circuits (ASICs), and/or the like. The memories comprise Random Access Memory (RAM), flash circuitry, disk drives, and/or the like. The memories store software like operating system, user applications, and network applications. Wireless UE 102 is configured and operates in a similar manner to wireless UE 101.

Provisioning circuitry 120 and messaging circuitry 130 comprise processing circuitry like microprocessors, memory, software, transceivers, and bus circuitry. The microprocessors comprise CPU, GPUs, ASICs, and/or the like. The memories comprise RAM, flash circuitry, disk drives, and/or the like. The memories store software like operating systems, virtual layers, and network applications. Exemplary network applications comprise Proxy Call State Control Function (P-CSCF), Serving Call State Control Function (S-CSCF), Internet Protocol (IP) Short Message Gateway (IPSM-GW), Short Message Service Center (SMSC), Short Message Peer-to-Peer Gateway (SMPP-GW) and/or some other Internet Protocol Multimedia Subsystem (IMS) messaging modules.

In operation, provisioning circuitry 120 transfers a QoS code to SIM circuitry 111 in wireless UE 101 over data link 141. The QoS code is associated with the enhanced QoS. SIM circuitry 111 receives and stores the QoS code. In some examples, the QoS code comprises a fully qualified domain name for an IPSM-GW, SMSC, S-CSCF, P-CSCF, or some other IMS network element in messaging circuitry 130. The fully qualified domain name is pre-associated with the enhanced QoS in messaging circuitry 130.

In wireless UE 101, processing circuitry 112 receives a user message that requires the enhanced QoS. For example, a first-responder may operate a touch display in wireless UE 101 to generate a WPS IPSM. In response to the enhanced QoS requirement, processing circuitry 112 retrieves the QoS code from SIM circuitry 111 over data link 113. Processing circuitry 112 generates a network message having the user message and the QoS code. The network message may comprise a Session Initiation Protocol (SIP) message that encapsulates the IPSM and that is addressed to the fully qualified domain name. Processing circuitry 112 wirelessly transfers the network message to messaging circuitry 130 over data link 143.

Messaging circuitry 130 receives the network message having the user message and the QoS code. In response to the QoS code in the network message, messaging circuitry 130 adds a QoS header to the network message that corresponds to the enhanced QoS. Messaging circuitry 130 handles the network message with the enhanced QoS in response to the QoS header. For example, the network message is exempt from overload-based discard. Messaging circuitry 130 then generates another network message having the user message and the QoS header. The other network message is addressed to the destination like UE 102 or some other entity. Messaging circuitry 130 handles the other network message with the enhanced QoS responsive the QoS header. Thus, the network message may be exempt from overload-based discard. Messaging circuitry 130 transfers the other network message with the QoS header over data link 144 and/or 145 to deliver the user message. Message circuitry 130 handles response messages that have the QoS header with the enhanced QoS.

In some examples, processing circuitry 112 in wireless UE 101 uses a QoS Establishment Cause to initiate the wireless transfer of the network message. The QoS Establishment Cause is pre-associated with the enhanced QoS in wireless communication network 100. Wireless communication network 100 transfers the network message from wireless UE 101 to messaging circuitry 130 using the enhanced QoS responsive to the QoS Establishment Cause. Together, the QoS Establishment Cause and the QoS code can extend the enhanced QoS for the user message from wireless UE 101 to wireless UE 102 (or data link 145). In examples where the enhanced QoS comprises WPS, a WPS Establishment Cause and WPS access class are used to initiate the transfer of WPS messages between wireless UE 101 and wireless UE 102 using WPS QoS.

Figure 2:
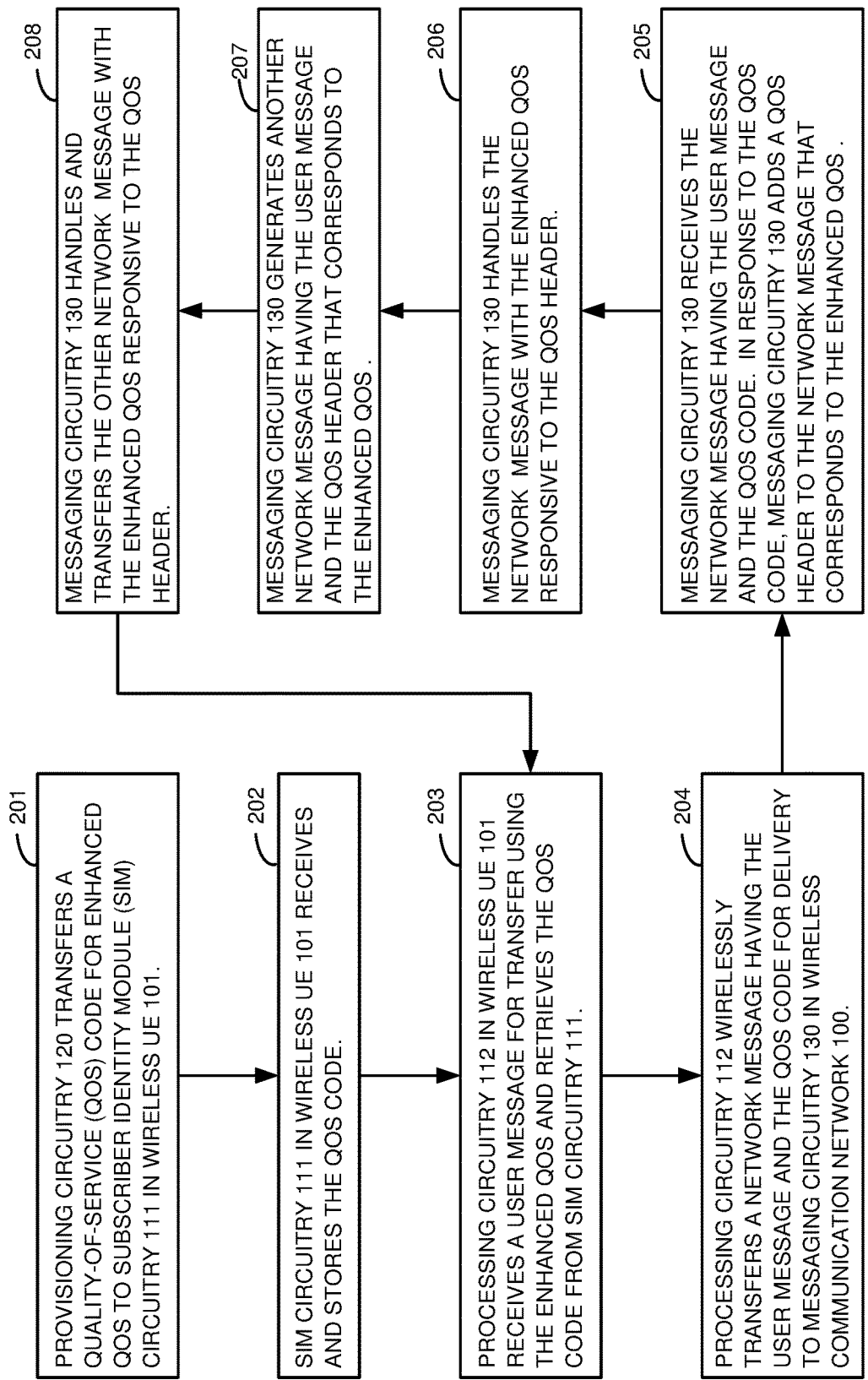
FIG. 2 illustrates the operation of the wireless communication network to transfer user messages for the wireless UE using the enhanced QoS.

FIG. 2 illustrates the operation of wireless communication network 100 to transfer the user messages for wireless UE 101 using the enhanced QoS. Provisioning circuitry 120 transfers a QoS code to Subscriber Identity Module (SIM) circuitry 111 in wireless UE 101 (201). The QoS code is associated with an enhanced QoS and may comprise a domain name for an IMS element in messaging circuitry 113. SIM circuitry 111 in wireless UE 101 receives and stores the QoS code (202). In wireless UE 101, processing circuitry 112 receives a user message that requires the enhanced QoS (203). In response to the enhanced QoS requirement, processing circuitry 112 retrieves the QoS code from SIM circuitry 111 (203). Processing circuitry 112 generates a network message having the user message and the QoS code (204). Processing circuitry 112 wirelessly transfers the network message to messaging circuitry 130 (204).

Messaging circuitry 130 receives the network message having the user message and the QoS code (205). In response to the QoS code in the network message, messaging circuitry 130 adds a QoS header to the network message that corresponds to the enhanced QoS (205). Messaging circuitry 130 handles the network message with the enhanced QoS (205) responsive the QoS header (206). Messaging circuitry 130 generates another network message that is addressed to the destination and that has the user message and the QoS header (207). Messaging circuitry 130 handles and transfers the other network message with the enhanced QoS responsive the other QoS header (208). Message circuitry 130 will also handle any response messages that have the QoS header with the enhanced QoS. The operation repeats (203-208).

Figure 3:
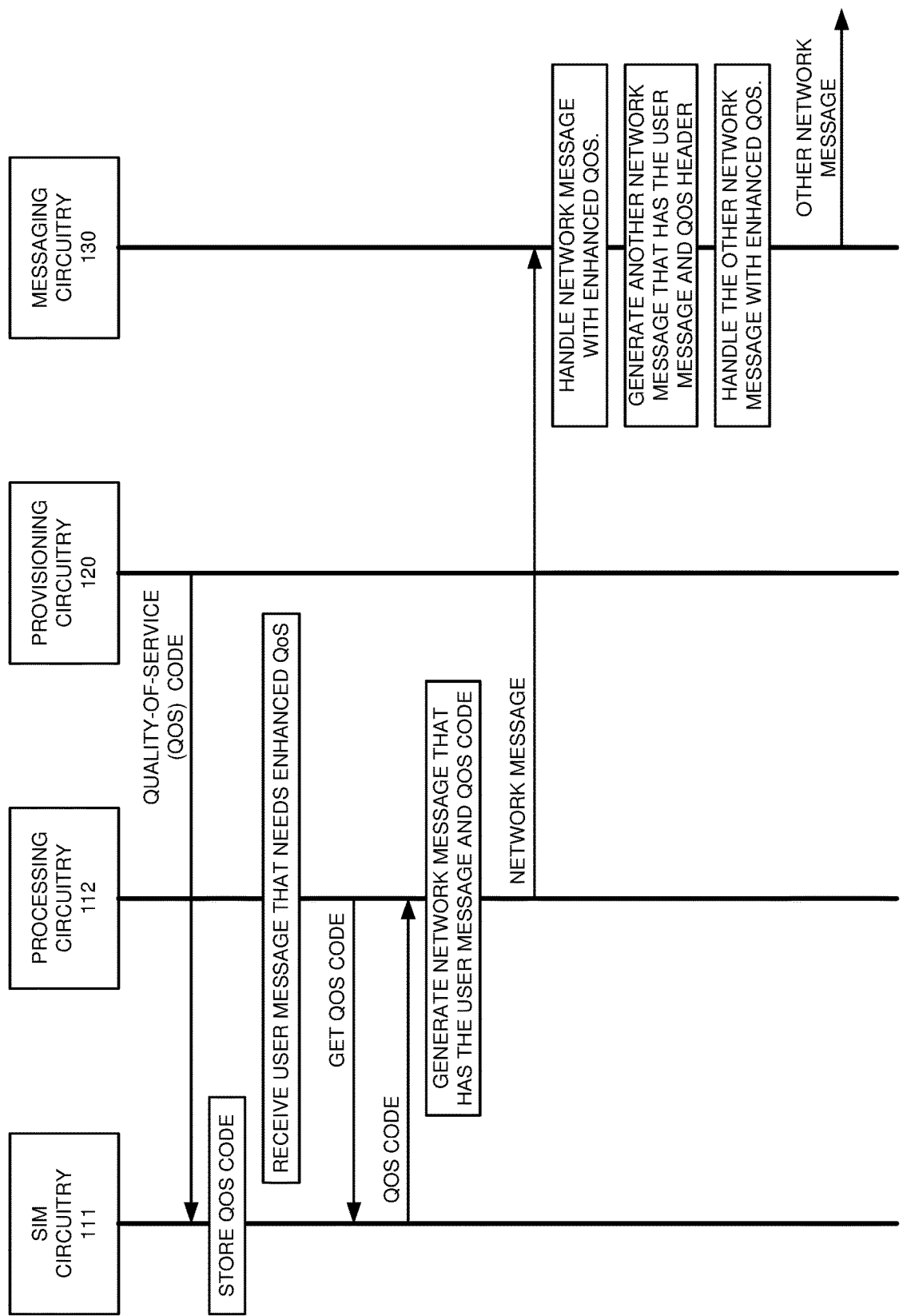
FIG. 3 illustrates the operation of the wireless communication network to transfer user messages for the wireless UE using the enhanced QoS.

FIG. 3 illustrates the operation of wireless communication network 100 to transfer the user messages using enhanced QoS. Provisioning circuitry 120 transfers a QoS code to SIM circuitry 111. Provisioning circuitry 120 may transfer the QoS code to SIM circuitry 111 during device activation or device personalization. SIM circuitry 111 stores the QoS code in a secure memory. The QoS code may be a domain name for an IMS network element that is also associated with the enhanced QoS. Processing circuitry 112 receives a user message that requires enhanced QoS. In response to the enhanced QoS requirement, processing circuitry 112 retrieves the QoS code from SIM circuitry 111. Processing circuitry 112 generates a network message that has the user message and the QoS code. For example, processing circuitry 112 may generate a SIP message that is addressed to a domain name that comprises the QoS code. Processing circuitry 112 transfers the network message to messaging circuitry 130.

Messaging circuitry 130 receives the network message having the user message and the QoS code. In response to the QoS code in the network message, messaging circuitry 130 adds a QoS header to the network message that corresponds to the enhanced QoS. Messaging circuitry 130 handles the network message with the enhanced QoS in response to the QoS header. Messaging circuitry 130 then generates another network message for the destination that has the user message and the QoS header. Messaging circuitry 130 handles the other network message with the enhanced QoS responsive the QoS header. Messaging circuitry 130 transfers the other network message to deliver the user message. Messaging circuitry 130 handles any subsequent response messages that have the QoS header with the enhanced QoS.

Figure 4:
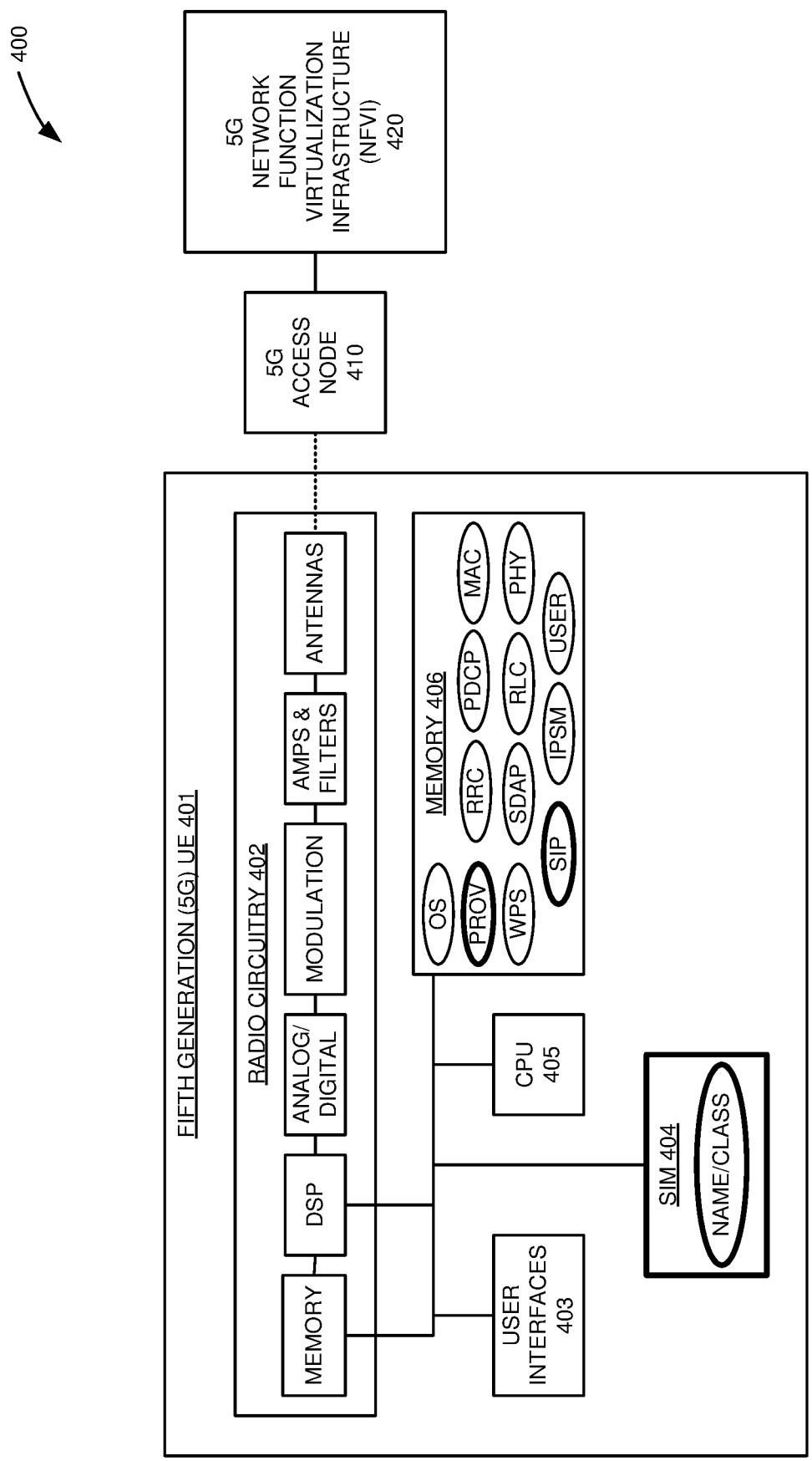
FIG. 4 illustrates a Fifth Generation (5G) wireless network that transfers user messages for 5G UEs using enhanced QoS.

FIG. 4 illustrates Fifth Generation (5G) wireless network 400 that transfers user messages for 5G UE 401 using enhanced QoS. 5G network 400 is an example of wireless communication network 100, although network 100 may differ. 5G network 400 comprises 5G UE 401, 5G access node 410, and 5G Network Function Virtualization Infrastructure (NFVI) 420. 5G UE 401 is an example of UEs 101-102, although UEs 101-102 may differ. UE 401 comprises radio circuitry 402, user interfaces 403, Subscriber Identity Module (SIM) 404, CPU 405, and memory 406 which are interconnected over bus circuitry. Radio circuitry 402 comprises antennas, amplifiers, filters, modulation, analog-to-digital interfaces, DSP, and memory that are coupled over bus circuitry. The antennas in 5G UE 401 are wirelessly coupled to 5G access node 410 which is coupled to 5G NFVI 420.

User interfaces 403 comprise graphic displays, machine controllers, sensors, cameras, transceivers, and/or some other user components. Memory 406 stores an operating system (OS), user applications (USER), and network applications. The network applications comprise software modules for provisioning (PROV), Wireless Priority Service (WPS), Internet Protocol Short Message (IPSM), Session Initiation Protocol (SIP), Physical Layer (PHY), Media Access Control (MAC), Radio Link Control (RLC), Packet Data Convergence Protocol (PDCP), Radio Resource Control (RRC), and Service Data Adaptation Protocol (SDAP). CPU 405 executes the operating system, user applications, and network applications to wirelessly exchange 5G signaling and 5G data with 5G access node 410 over radio circuitry 402.

In radio circuitry 402, the antennas receive wireless 5G signals from 5G access node UE 401 that transport Downlink (DL) 5G signaling and DL 5G data. The antennas transfer corresponding electrical DL signals through duplexers to the amplifiers. The amplifiers boost the received DL signals for filters which attenuate unwanted energy. In modulation, demodulators down-convert the DL signals from their carrier frequency. The analog/digital interfaces convert the analog DL signals into digital DL signals for the DSP. The DSP recovers DL 5G symbols from the DL digital signals. CPU 405 executes network applications (RRC, SDAP, PDCP, RLC, MAC, PHY) to process the DL 5G symbols and recover the DL 5G signaling and DL 5G data.

In CPU 405, the user applications transfer UL user data and UL user signaling to the RRC. The RRC processes the Uplink (UL) user signaling and the DL 5G signaling to generate corresponding DL user signaling and UL 5G signaling. The SDAP interworks between UL/DL user data and the UL/DL 5G data. The network applications (RRC, SDAP, PDCP, RLC, MAC, PHY) process the UL 5G signaling and the UL 5G data to generate corresponding UL 5G symbols. In radio 402, the DSP processes the UL 5G symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless 5G signals that transport the UL 5G signaling and UL 5G data to 5G access node 410.

RRC functions comprise authentication, security, handover control, status reporting, Quality-of-Service (QoS), network broadcasts and pages, and network selection. SDAP functions comprise QoS marking and flow control. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

In operation, CPU 405 executes the provisioning application to perform a provisioning session when UE 401 is personalized during device activation. The activation process typically occurs when UE 401 is purchased by the user. The device activation may use a direct data link to a provisioning computer and/or a secure network link to a remote provisioning computer. For example, one of user interfaces 403 may comprise a network transceiver that interacts with a distant provisioning computer. During the provisioning session, the provisioning application receives a Wireless Priority Service (WPS) domain name and a WPS access class. The provisioning application transfers the WPS domain name and the WPS access class to SIM 404 for secure storage and use. SIM 404 stores the WPS domain name and WPS access class.

In response to power-up, the RRC application exchanges 5G signaling with 5G access node 410 which establishes an Internet Multimedia Subsystem (IMS) bearer between UE 401 and a Proxy Call State Control Function (P-CSCF) in 5G NFVI 420. The SIP application interacts with the P-CSCF over the IMS bearer to register 5G UE 401 with the IMS in NFVI 420.

Subsequently, the WPS application generates a WPS message—typically in response to human interaction with user interfaces 403. To generate the WPS message, the WPS application launches the IPSM application, and the IPSM application interacts with the user over user interfaces 403 to generate a WPS IPSM having the WPS message. The IPSM application transfers the WPS IPSM to the SIP application and indicates the WPS. In response to the WPS IPSM, the SIP application retrieves the WPS domain name from SIM 404. The SIP application generates a WPS SIP message that is addressed to the WPS domain name and encapsulates the WPS IPSM in the WPS SIP message. The SIP application transfers the WPS SIP message to the SDAP and signals the RRC. The RRC initiates a data transfer over the IMS bearer using the WPS access class. The SDAP transfers the WPS SIP message to radio circuitry 402 over the network applications (PDCP, RLC, MAC, PHY). Radio circuitry 401 transfers the WPS SIP message to 5G access node 410 over the IMS bearer using the WPS access class. 5G access node 410 transfers the WPS SIP message over the IMS bearer to the P-CSCF in 5G NFVI 420.

Figure 5:
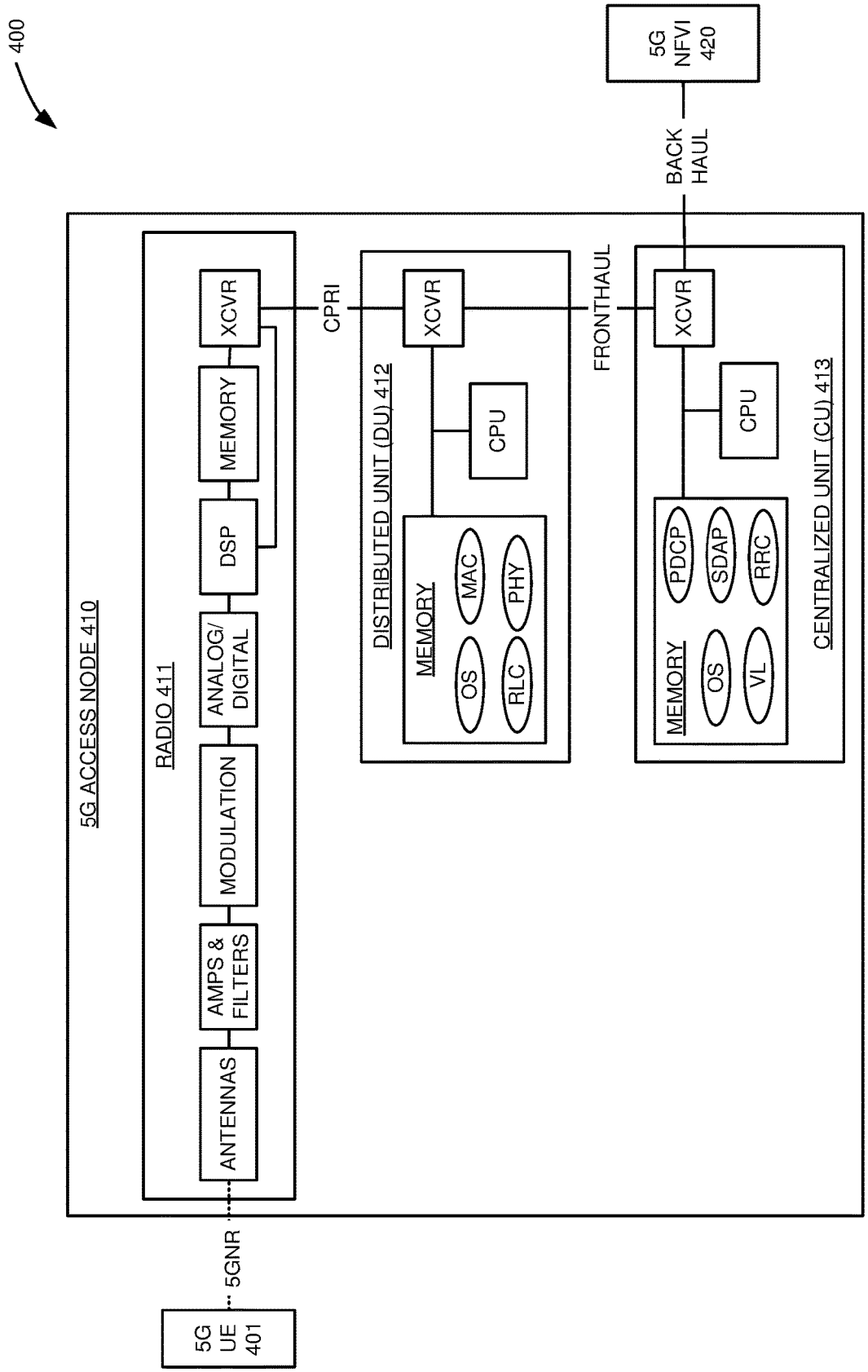
FIG. 5 illustrates a 5G wireless access node that transfers the user messages for the 5G UEs using the enhanced QoS.

FIG. 5 illustrates 5G access node 410 that transfers user messages for 5G UE 401 using the enhanced QoS. 5G access node 410 is an example of data communication links 143-144, although links 143-144 may differ. 5G access node 410 comprises radio 411, Distributed Unit (DU) 412, and Centralized Unit (CU) 413. Radio 411 comprises antennas, amplifiers, filters, modulation, analog-to-digital interfaces, DSP, and memory that are coupled over bus circuitry. DU 412 comprises memory, Central Processing Units (CPU), and transceivers (XCVR) that are coupled over bus circuitry. CU 413 comprises memory, CPU, and transceivers that are coupled over bus circuitry.

5G UE 401 is wirelessly coupled to the antennas in radio 411 over 5G New Radio (NR) links. The radio transceivers are coupled to the DU transceivers over Common Public Radio Interface (CPRI) links. The DU transceivers are coupled to the CU transceivers over fronthaul links. The CU transceivers are coupled to 5G NFVI 420 over backhaul links. The DU memory stores an operating system, PHY, MAC, and RLC. The CU memory stores an operating system, virtual layer (VL), PDCP, RRC, and SDAP. The virtual layer comprises hypervisor modules, virtual switches, virtual CPUs, and/or the like. The CPU in CU 413 executes the PDCP, RRC, and SDAP to drive the exchange of user data and network signaling between 5G NFVI 420 and DU 412. The CPU in DU 412 executes the PHY, MAC, and RLC to drive the transfer of user data and network signaling between CU 413 and 5G UE 401. The functionality split of the network applications (PHY, MAC, RLC, PDCP, RRC, SDAP) between DU 412 and CU 413 may vary.

In radio circuitry 411, the antennas receive wireless 5GNR signals from 5G UE 401 that transport Uplink (UL) 5G signaling and UL 5G data. The antennas transfer corresponding electrical UL signals through duplexers to the amplifiers. The amplifiers boost the received UL signals for filters which attenuate unwanted energy. In modulation, demodulators down-convert the UL signals from their carrier frequency. The analog/digital interfaces convert the analog UL signals into digital UL signals for the DSP. The DSP recovers UL 5GNR symbols from the UL digital signals. In DU 412 and CU 413, the CPUs execute the network applications to process the UL 5GNR symbols and recover the UL 5G signaling and UL 5G data. In CU 413, the CPU executes the RRC to process the UL 5G signaling and DL 5G signaling to generate new UL 5G signaling and new DL 5G signaling. The SDAP handles UL/DL 5G data. The RRC transfers the new UL 5G signaling to Access and Mobility Management Functions (AMFs) in 5G NFVI 420 over the backhaul links. The SDAP transfers the UL 5G data to User Plane Functions (UPFs) in 5G NFVI 420 over the backhaul links.

The transceivers in CU 413 receive the DL 5G signaling from the AMFs and receive the DL 5G data from the UPFs in 5G NFVI 420. CU 413 and DU 412 execute the network applications to process the new DL 5G signaling and the DL 5G data to generate corresponding DL 5GNR symbols that carry the DL 5G signaling and DL 5G data. In radio 411, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL 5G signaling and DL 5G data to 5G UE 401.

RRC functions comprise authentication, security, handover control, status reporting, QoS, network broadcasts and pages, and network selection. SDAP functions comprise QoS marking and flow control. PDCP functions comprise LTE/5GNR allocations, security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

If the CPUs or memories overload in 5G access node 410, the RRC in CU 413 signals back-away instructions to UEs of certain access classes, but the RRC does not back-away the WPS access class of 5G UE 401. The RRC in 5G access node 410 interacts with 5G UE 401 and the AMF in 5G NFVI 420 to establish an IMS bearer between UE 401 and an IMS P-CSCF. The RRC in 5G access node exchanges SIP messages between UE 401 and the P-CSCF in 5G NFVI 420 over the IMS bearer.

Figure 6:
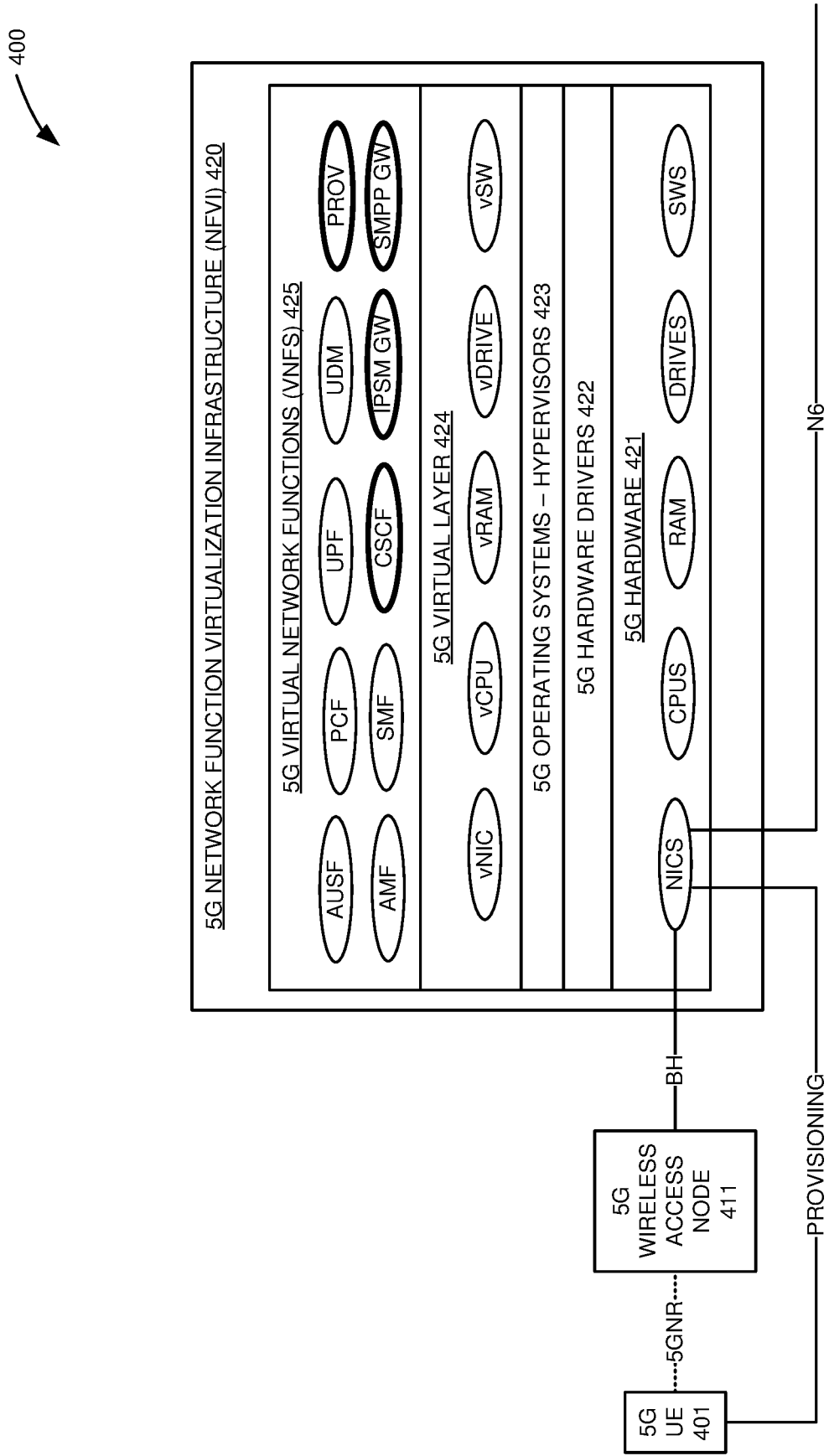
FIG. 6 illustrates a 5G Network Function Virtualization Infrastructure (NFVI) that transfers the user messages for the 5G UEs using the enhanced QoS.

FIG. 6 illustrates a 5G Network Function Virtualization Infrastructure (NFVI) that transfers the user messages for the 5G UEs using the enhanced QoS. 5G NFVI 420 is an example of provisioning circuitry 120 and messaging circuitry 130, although circuitry 120 and 130 may differ. 5G NFVI 420 comprises 5G hardware 421, 5G hardware drivers 422, 5G operating systems and hypervisors 423, 5G virtual layer 424, and 5G Virtual Network Functions (VNFs) 425. 5G hardware 421 comprises Network Interface Cards (NICs), CPUs, RAM, flash/disk drives, and data switches (SWS). 5G virtual layer 424 comprises virtual NICs (vNIC), virtual CPUs (vCPU), virtual RAM (vRAM), virtual Drives (vDRIVE), and virtual Switches (vSW). The NICs are coupled to 5G access node 411, 5G UE 401, and external systems over various data links.

5G VNFs 425 comprise Authentication and Security Functions (AUSF), Policy Control Functions (PCF), Access and Mobility Management Functions (AMF), Session Management Functions (SMF), User Plane Functions (UPF), Unified Data Management (UDM), Call State Control Functions (CSCFs), Internet Protocol Short Message Gateway (IPSM GW), and Short Message Peer-to-Peer Gateway (SMPP GW). Other 5G network functions are typically present but are omitted for clarity. 5G hardware 421 executes 5G hardware drivers 422, 5G operating systems and hypervisors 423, 5G virtual layer 424, and 5G VNFs 425 to serve the 5G UE 401 with enhanced WPS messaging.

During device actuation, the provisioning VNF in transfers a WPS access class and a fully qualified WPS domain name to the SIM in 5G UE 401 over a secure provisioning data link. The AMF VNF exchanges signaling with 5G UE 401 and 5G access node 411 to establish an IMS bearer between 5G UE 401 and a P-CSCF VNF. The P-CSCF VNF receives a WPS SIP message from 5G UE 401 over the IMS bearer. The WPS SIP message is addressed to the fully qualified WPS domain name stored in the SIM.

The P-CSCF VNF receives the WPS SIP message, and in response to the WPS domain name in the "TO:" field, adds a WPS header to the WPS SIP message. The WPS header uses a namespace like "ets.0" to indicate WPS and preclude overload discard. The P-CSCF VNF also adds a Differentiated Services Control Protocol (DSCP) mark like "DSCP=40" to apply WPS QoS in the IMS elements like the P-CSCF, S-CSCF, IPSM GW, and SMPP GW. The P-CSCF VNF transfers the WPS SIP message to the S-CSCF. The S-CSCF VNF transfers the WPS SIP message to the IPSM GW VNF. The receiving VNFs acknowledge the receipt of the WPS SIP message to the sending VNFs.

To deliver the WPS IPSM, the IPSM GW VNF generates another WPS SIP message that is addressed to the destination. The other WPS SIP message also has the WPS IPSM, the WPS header (namespace=ets.0), and the QoS mark (DSCP=40). The IPSM GW VNF transfers the new WPS message to the SMPP GW VNF. The SMPP GW VNF transfers the new WPS message to another SMPP GW VNF for possible delivery over another IPSM GW, S-CSCF, and P-CSCF. The P-CSCFs, S-CSCFs, IPSM GWs, and SMPP GWs all handle the new SIP message with WPS QoS based on the priority header and the DHCP mark. The P-CSCFs, S-CSCFs, IPSM GWs, and SMPP GWs also handle SIP responses to the SIP message with WPS QoS based on the priority header and the DHCP mark in the SIP responses.

Figure 7:
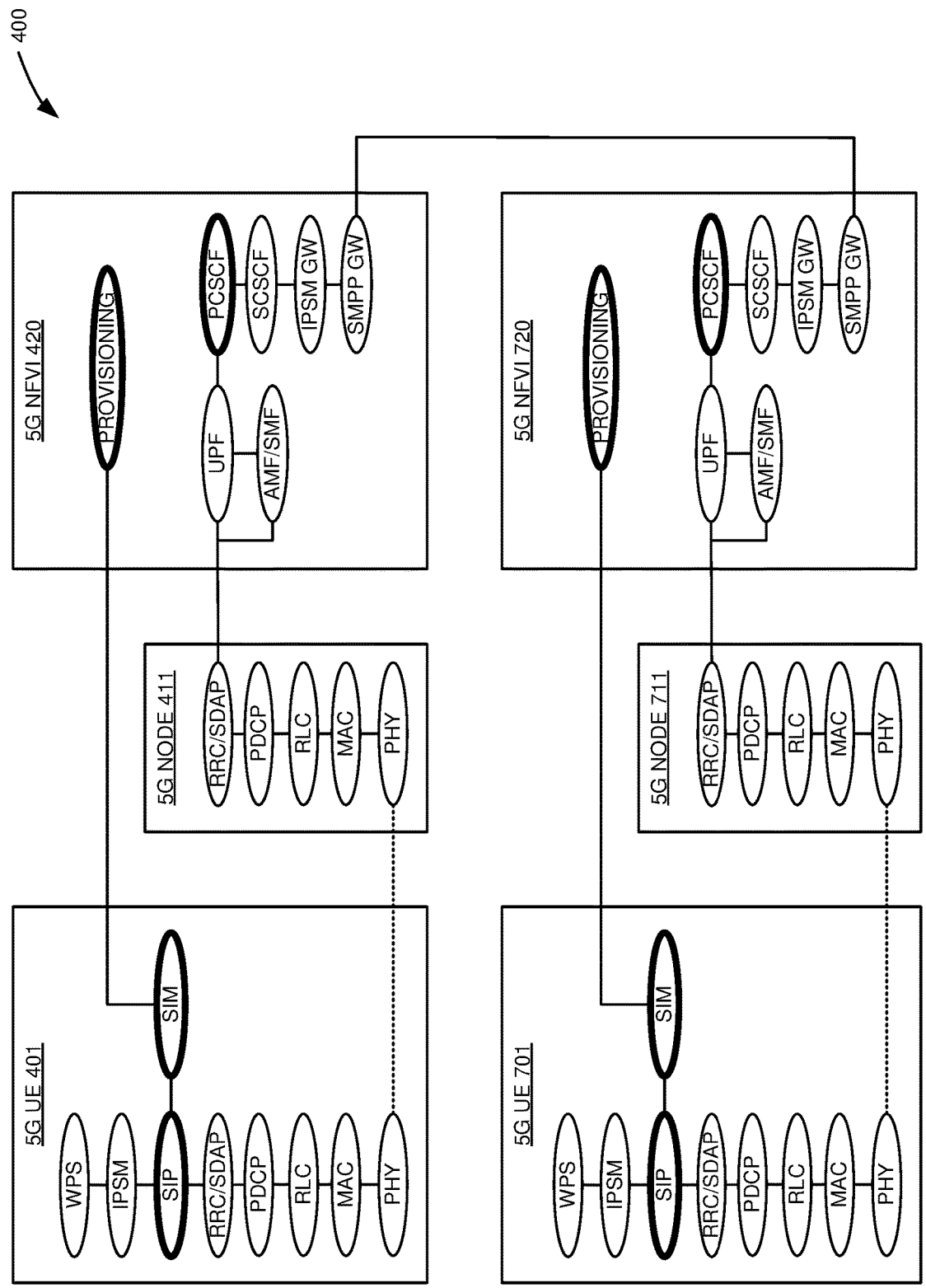
FIG. 7 illustrates the operation of the 5G wireless network to transfer the user messages for the 5G UEs using the enhanced QoS.

FIG. 7 illustrates the operation of 5G wireless network 400 to transfer user messages between 5G UE 401 and 5G UE 701 using enhanced WPS QoS. During device actuation, the provisioning VNF in 5G NFVI 420 transfers a WPS access class and a fully qualified WPS domain name to the SIM in 5G UE 401 and 701. The provisioning VNF in 5G NFVI 420 transfers the WPS access class and another fully qualified WPS domain name to the SIM in 5G UE 701.

In 5G UE 401, the RRC exchanges network signaling with the RRC/SDAP in 5G access node 411 over their PDCPs, RLCs, MACs, and PHYs. The RRC in access node 411 exchanges N2 signaling with the AMF. The RRCs and AMF establish an IMS bearer between the RRC in 5G UE 401 and the P-CSCF in 5G NFVI 420. The SIP application in UE 401 interacts with the P-CSCF in NFVI 420 over the IMS bearer to register 5G UE 401 with the IMS in NFVI 420.

In 5G UE 701, the RRC exchanges network signaling with the RRC/SDAP in 5G access node 711 over their PDCPs, RLCs, MACs, and PHYs. The RRC in access node 711 exchanges N2 signaling with the AMF. The RRCs and AMF establish an IMS bearer between the RRC in 5G UE 701 and a P-CSCF in 5G NFVI 720. The SIP application in UE 701 interacts with the P-CSCF in NFVI 720 over the IMS bearer to register 5G UE 701 with the IMS in NFVI 720.

In 5G UE 401, the WPS application uses the Internet Protocol Short Message (IPSM) application to generate an IPSM having a WPS message for delivery to 5G UE 702. The IPSM application transfers (and indicates) the WPS IPSM to the SIP application. The SIP application retrieves the WPS domain name from the SIM. The SIP application generates a WPS SIP message that is addressed to the WPS domain name and that encapsulates the WPS IPSM. The SIP application transfers the WPS SIP message to the SDAP and signals the RRC. The RRC initiates a data transfer over the IMS bearer using the WPS access class. The SDAP transfers the WPS SIP message to 5G access node 410 over the IMS bearer using the WPS access class. 5G access node 410 transfers the WPS SIP message over the IMS bearer to the P-CSCF in 5G NFVI 420.

The P-CSCF in 5G NFVI 420 receives the WPS SIP message and adds a WPS header responsive to the WPS domain name. The P-CSCF uses the namespace "ets.0" to indicate WPS and to preclude overload discard. The P-CSCF adds a DSCP mark to apply the WPS QoS in IMS elements like the P-CSCF, S-CSCF, IPSM GW, and SMPP GW. The P-CSCF VNF transfers the WPS SIP message to the S-CSCF. The S-CSCF VNF authorizes and routes the WPS SIP message to the IPSM GW VNF. The receiving VNFs acknowledge the receipt of the WPS SIP message to the sending VNFs.

To deliver the WPS IPSM to NFVI 720 which serves UE 701, the IPSM GW VNF generates another WPS SIP message that is addressed to the SMPP GW in NFVI 720. The IPSM GW in NFVI 420 may use a Short Message Service Center (SMSC) for SIP message routing and generation. The new WPS SIP message has the WPS IPSM, WPS header, and DSCP mark. The IPSM GW in NFVI 420 transfers the new WPS SIP message to the IPSM GW in NFVI 720 over the SMPP GWs in NFVI 420 and NFVI 720.

To deliver the WPS IPSM to 5G UE 701, the IPSM GW VNF in NFVI 720 generates another WPS SIP message that is addressed to UE 701. The IPSM GW in NFVI 720 may use an SMSC for SIP message routing and generation. The new WPS SIP message has the WPS IPSM, WPS header, and DSCP mark. The IPSM GW in NFVI 720 transfers the new WPS SIP message to the S-CSCF in NFVI 720. The S-CSCF transfers the new SIP message to the P-CSCF in NFVI 720. The P-CSCF in NFVI 720 transfers the new SIP message to 5G UE 701 over the IMS bearer between 5G UE 701 and NFVI 720. The IPSM application displays the WPS IPSM from the WPS SIP message to the user of UE 701.

In NFVI 420 and NFVI 720, the P-CSCFs, S-CSCFs, IPSM GWs, and SMPP GWs handle the WPS SIP messages with WPS QoS based on the priority header and the DSCP mark. 5G UE 401 and 5G UE 701 add the priority header and the DSCP mark to SIP response messages. The P-CSCFs, S-CSCFs, IPSM GWs, and SMPP GWs in NFVI 420 and NFVI 720 handle the response SIP messages with the WPS QoS based on the priority header and the DHCP mark in the responses.

The wireless data network circuitry described above comprises computer hardware and software that form special-purpose network circuitry to transfer user messages using an enhanced QoS—possibly critical WPS messages. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to transfer user messages using an enhanced QoS.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to transfer a user message for a wireless User Equipment (UE) using enhanced Quality-of-Service (QoS), the method comprising:
    provisioning circuitry transferring a QoS code that is associated with the enhanced QoS for delivery to Subscriber Identity Module (SIM) circuitry in the wireless UE;
    the SIM circuitry in the wireless UE receiving and storing the QoS code;
    processing circuitry in the wireless UE receiving the user message for transfer using the enhanced QoS, and in response, retrieving the QoS code from the SIM circuitry and wirelessly transferring a network message having the user message and the QoS code for delivery to messaging circuitry in the wireless communication network;
    the messaging circuitry receiving the network message having the user message and the QoS code, and in response to the QoS code, adding a QoS header to the network message that corresponds to the enhanced QoS and handling the network message having the QoS header with the enhanced QoS; and
    the messaging circuitry generating a new network message having the QoS header for the enhanced QoS and the user message, handling the new network message having the QoS header with the enhanced QoS, and transferring the new network message having the QoS header and the user message for delivery to a destination.

2. The method of claim 1 wherein the QoS code comprises a domain name associated with the messaging circuitry.

3. The method of claim 1 wherein the enhanced QoS comprises a Session Initiation Protocol (SIP) message overload exemption in the messaging circuitry.

4. The method of claim 1 wherein the enhanced QoS comprises Wireless Priority Service (WPS).

5. The method of claim 1 wherein the user message comprises an Internet Protocol Short Message (IPSM).

6. The method of claim 1 wherein the network message comprises a Session Initiation Protocol (SIP) message.

7. The method of claim 1 wherein the messaging circuitry comprises a Proxy Call State Control Function (P-CSCF).

8. The method of claim 1 wherein the messaging circuitry comprises a Serving Call State Control Function (S-CSCF).

9. The method of claim 1 wherein the messaging circuitry comprises an Internet Protocol Short Message Gateway (IPSM-GW).

10. The method of claim 1 wherein:
    the processing circuitry wirelessly transferring the network message comprises wirelessly transferring the network message using an Establishment Cause that is associated with the enhanced QoS; and
    the wireless communication network transfers the network message using the enhanced QoS from the wireless UE to the messaging circuitry responsive to the Establishment Cause.

11. A wireless communication network to transfer a user message for a wireless User Equipment (UE) using enhanced Quality-of-Service (QoS), the wireless communication network comprising:
    provisioning circuitry configured to transfer a QoS code that is associated with the enhanced QoS for delivery to Subscriber Identity Module (SIM) circuitry in the wireless UE;
    the SIM circuitry in the wireless UE configured to receive and store the QoS code;
    processing circuitry in the wireless UE configured to receive the user message for transfer using the enhanced QoS, and in response, retrieve the QoS code from the SIM circuitry and wirelessly transfer a network message having the user message and the QoS code for delivery to messaging circuitry in the wireless communication network;
    the messaging circuitry configured to receive the network message having the user message and the QoS code, and in response to the QoS code, add a QoS header to the network message that corresponds to the enhanced QoS and handle the network message having the QoS header with the enhanced QoS; and
    the messaging circuitry configured to generate a new network message having the QoS header for the enhanced QoS and the user message, handle the new network message having the QoS header with the enhanced QoS, and transfer the new network message having the QoS header and the user message for delivery to a destination.

12. The wireless communication network of claim 11 wherein the QoS code comprises a domain name associated with the messaging circuitry.

13. The wireless communication network of claim 11 wherein the enhanced QoS comprises a Session Initiation Protocol (SIP) message overload exemption in the messaging circuitry.

14. The wireless communication network of claim 11 wherein the enhanced QoS comprises Wireless Priority Service (WPS).

15. The wireless communication network of claim 11 wherein the user message comprises an Internet Protocol Short Message (IPSM).

16. The wireless communication network of claim 11 wherein the network message comprises a Session Initiation Protocol (SIP) message.

17. The wireless communication network of claim 11 wherein the messaging circuitry comprises a Proxy Call State Control Function (P-CSCF).

18. The wireless communication network of claim 11 wherein the messaging circuitry comprises a Serving Call State Control Function (S-CSCF).

19. The wireless communication network of claim 11 wherein the messaging circuitry comprises an Internet Protocol Short Message Gateway (IPSM-GW).

20. The wireless communication network of claim 11 wherein:
- the processing circuitry is configured to wirelessly transfer the network message using an Establishment Cause that is associated with the enhanced QoS; and
- the wireless communication network is configured to transfer the network message using the enhanced QoS from the wireless UE to the messaging circuitry responsive to the Establishment Cause.

* * * * *